United States Patent [19]
Itoh

[11] Patent Number: 5,585,971
[45] Date of Patent: Dec. 17, 1996

[54] SMALL-SIZED VARIABLE MAGNIFICATION LENS

[75] Inventor: Yoshinori Itoh, Kanagawa-ken, Japan

[73] Assignee: Canon Kabushiki Kaisha, Tokyo, Japan

[21] Appl. No.: 210,444

[22] Filed: Mar. 21, 1994

[30] Foreign Application Priority Data

Mar. 30, 1993 [JP] Japan .................................. 5-071845

[51] Int. Cl.$^6$ ................................................. G02B 15/14
[52] U.S. Cl. ........................... 359/692; 359/714; 359/715
[58] Field of Search .................................. 359/692, 715, 359/716, 717, 745, 747, 748, 714

[56] References Cited

U.S. PATENT DOCUMENTS

| | | | |
|---|---|---|---|
| 4,818,081 | 4/1989 | Ito | 359/692 |
| 4,953,957 | 9/1990 | Kobayashi | 359/692 |
| 5,218,478 | 6/1993 | Itoh | 359/692 |
| 5,274,504 | 12/1993 | Itoh | 359/676 |
| 5,305,148 | 4/1994 | Ikeori, et al. | 359/689 |
| 5,386,321 | 1/1995 | Kawamura | 359/692 |

FOREIGN PATENT DOCUMENTS

| | | |
|---|---|---|
| 57-201213 | 12/1982 | Japan . |
| 60-170816 | 9/1985 | Japan . |
| 60-191216 | 9/1985 | Japan . |
| 62-56917 | 3/1987 | Japan . |
| 62-284319 | 12/1987 | Japan . |

Primary Examiner—David C. Nelms
Assistant Examiner—Ju A. Le
Attorney, Agent, or Firm—Fitzpatrick, Cella, Harper & Scinto

[57] ABSTRACT

A zoom lens is disclosed, comprising, from front to rear, a first lens unit having a positive refractive power and a second lens unit having a negative refractive power, an air separation between the first and second lens units being varied to vary the focal length, wherein the first lens unit comprises, from front to rear, a front lens unit having a negative refractive power, a stop and a rear lens unit having a positive refractive power, satisfying the following condition:

$$0.053 < l/fw < 0.1$$

where l is an air separation between the stop and the rear lens unit when the zoom lens is focused on an infinitely distant object, and fw is the shortest focal length of the entire lens system.

8 Claims, 8 Drawing Sheets

SMALL-SIZED VARIABLE MAGNIFICATION LENS

BACKGROUND OF THE INVENTION

1. Field of the Invention

This invention relates to small-sized variable magnification lenses comprised of two lens units suited to lens shutter cameras, video cameras, etc., and, more particularly, to small-sized zoom lenses well corrected for aberrations along with the total length (from the first lens surface to the image plane) shortened by setting forth proper design rules for each lens unit.

2. Description of the Related Art:

Recently, along with reduction of the size of lens shutter cameras, video cameras, etc., there is a growing demand for small-sized zoom lenses of short total length. Even in the field of lens shutter cameras, particularly the compact cameras that are not to interchange the lenses, the use of a zoom lens is looked forward. The zoom lens is nonetheless desired to be as small in size or total length as the monofocal lens used in the past is.

In Japanese Laid-Open Patent Applications Nos. Sho 57-201213, Sho 60-170816, Sho 60-191216 and Sho 62-56917, small-sized zoom lenses are proposed, comprising, from front to rear, a first lens unit of positive refractive power and a second lens unit of negative refractive power, totaling two lens units, the separation between both lens units being varied to vary the magnification. By this, a zoom lens is achieved which employs the arrangement of positive and negative refractive powers in this order from the object side, and whose back focal distance is made relatively short, while still permitting the total length of the lens to be shortened.

Besides these, in Japanese Laid-Open Patent Application No. Sho 62-284319, a zoom lens is disclosed, comprising a first lens unit of positive refractive power and a second lens unit of negative refractive power, the magnification being varied by moving both of the lens units forward while varying the separation between the two lens units.

In the conventional plus-minus 2-unit zoom lenses, there are known a zoom type having a stop in between the first and second lens units and another zoom type having a stop within the first lens unit. In the zoom type having the stop in between the first and second lens units, the barrel construction becomes relatively simple in structure, so that it is easy to hold tolerances for the position of the first lens unit, but it becomes difficult to maintain good correction of aberrations in such a manner that the size is reduced.

Meanwhile, in the zoom type having the stop in the interior of the first lens unit, the structure of the barrel construction tends conversely to increase in complexity, but, because of the stop disposed on the front side, it is easy to afford for an advance in compactness and an increase of the maximum image angle. Further, the aberration correction tends to become relatively easy.

SUMMARY OF THE INVENTION

An object of the invention is to achieve a lens system which, while keeping the good correction of aberrations, gets an ultra-compact form by making innovations in the construction and arrangement of the constituent elements of the first lens unit and the position of the stop. Another object is to provide a variable magnification lens having as high a zooming range as about 2 in the zoom ratio.

To accomplish the above-described objects, according to the invention, in a preferred embodiment thereof, a zoom lens comprises, from front to rear, a first lens unit of positive refractive power and a second lens unit of negative refractive power, an air separation between the first and second lens units being varied to vary magnification, wherein the first lens unit comprises, from front to rear, a front lens unit having a negative refractive power, a stop and a rear lens unit having a positive refractive power, satisfying the following condition:

$$0.053 < l/fw < 0.1$$

where $l$ is an air separation between the stop and the rear lens unit when said zoom lens is focused on an infinitely distant object, and $fw$ is the shortest focal length of the entire lens system.

BRIEF DESCRIPTION OF THE DRAWINGS

FIGS. 2(A), 2(B) and 2(C) are longitudinal section views of a numerical example 1 of a lens of the invention with an object at infinity focused on.

FIGS. 3(A), 3(B) and 3(C) are longitudinal section views of the numerical example 1 of the lens of the invention with an object at a distance of 60 cm focused on.

FIGS. 4(A), 4(B) and 4(C) are longitudinal section views of a numerical example 2 of a lens of the invention with an-object at infinity focused on.

FIGS. 5(A), 5(B) and 5(C) are longitudinal section views of the numerical example 2 of the lens of the invention with an object at a distance of 60 cm focused on.

In the aberration curves, d stands for the spectral d-line, g for the spectral g-line, $\Delta S$ for the sagittal image focus and $\Delta M$ for the meridional image focus.

DETAILED DESCRIPTION OF THE PREFERRED EMBODIMENTS

The variable magnification lens of the invention is next described by reference to the drawings.

Figure 1A:
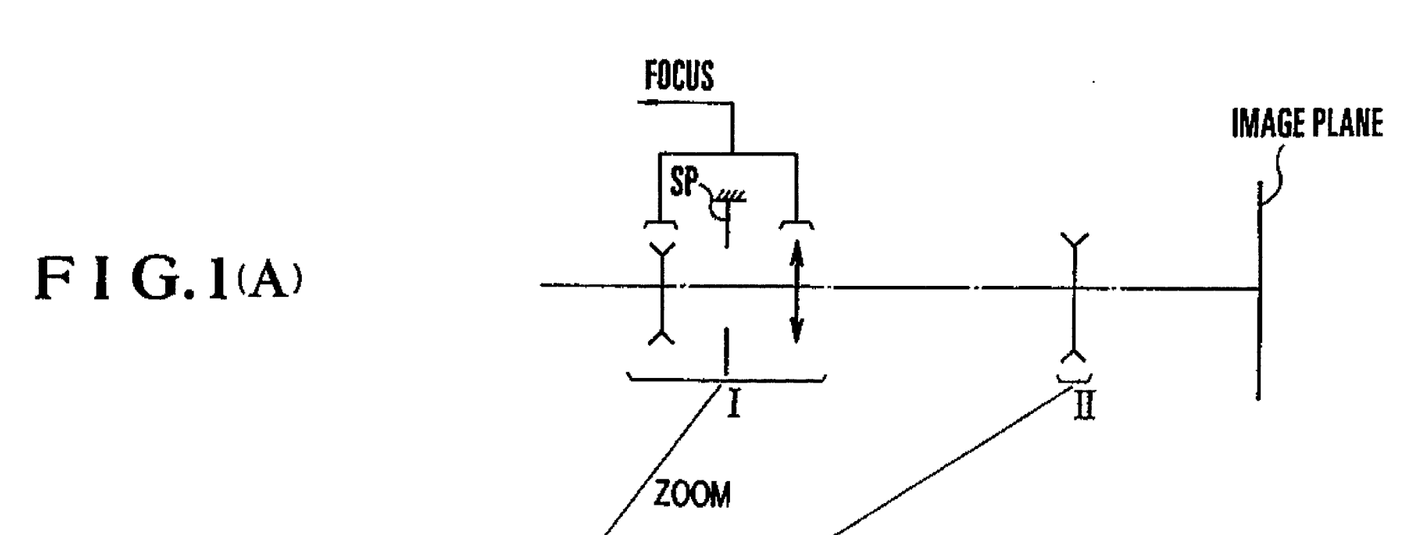
FIGS. 1(A) and 1(B) are diagrams of the paraxial refractive power arrangement of a zoom lens according to the invention.
Figure 1B:
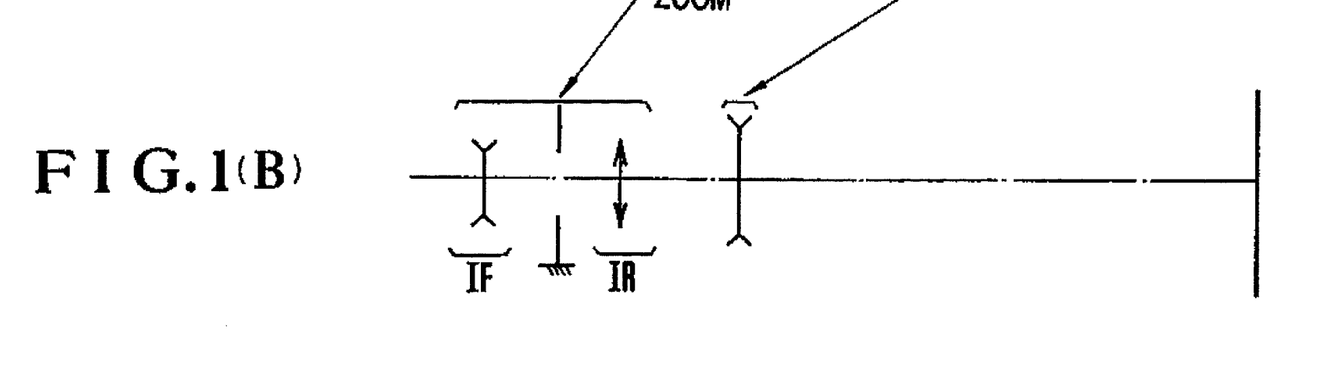
Figure 2A:
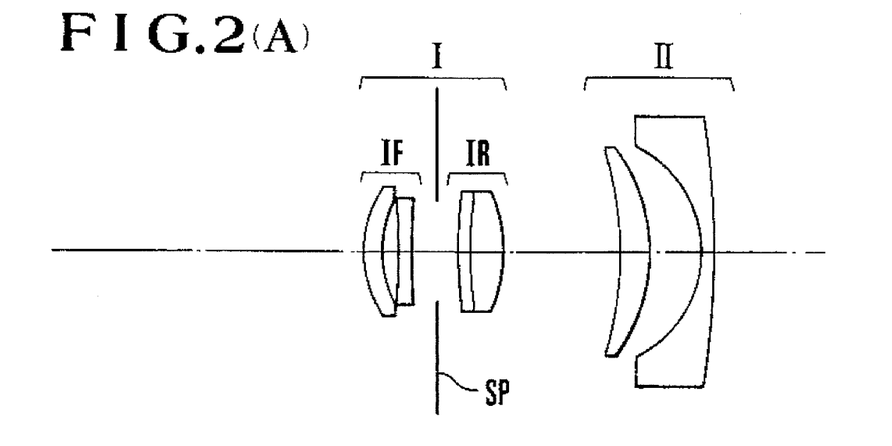
Figure 2B:
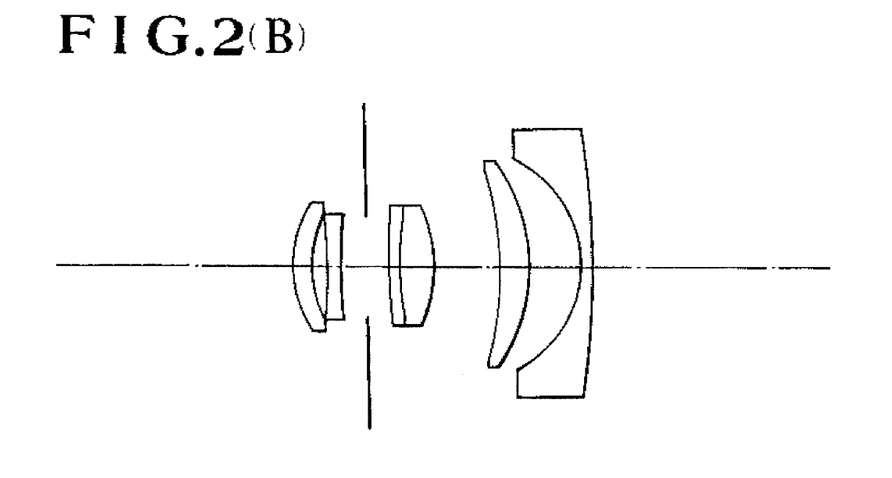
Figure 2C:
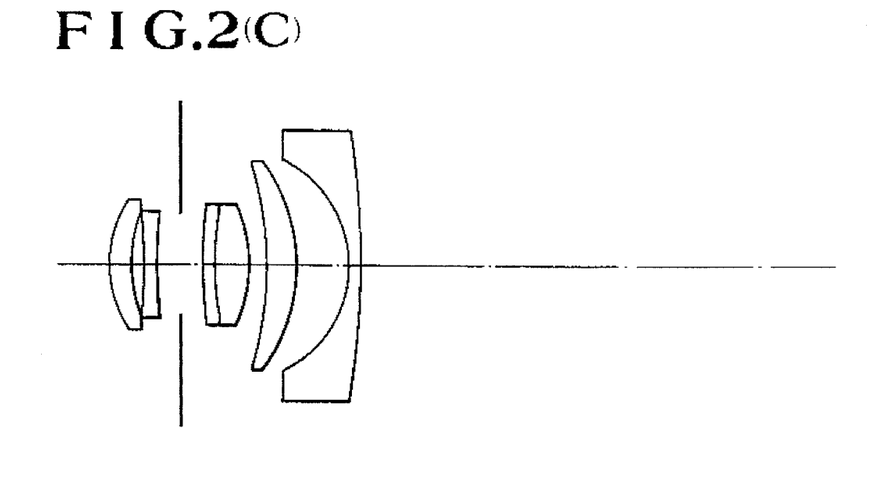
Figure 3A:
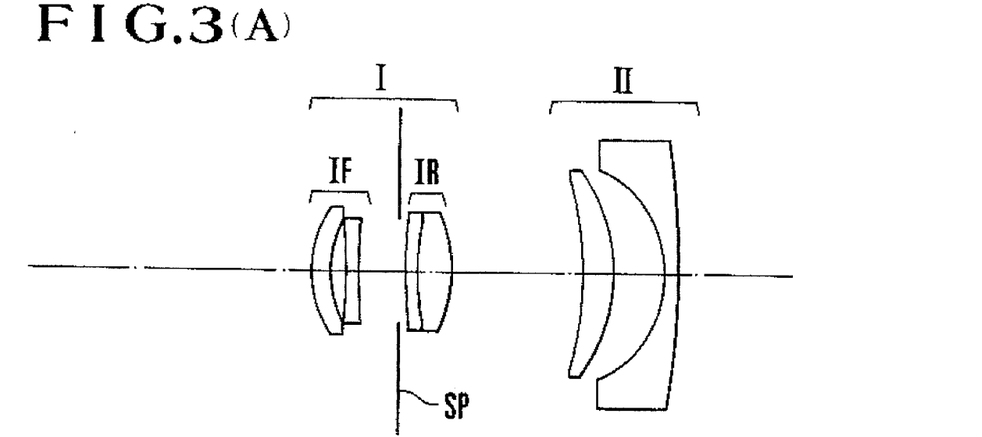
Figure 3B:
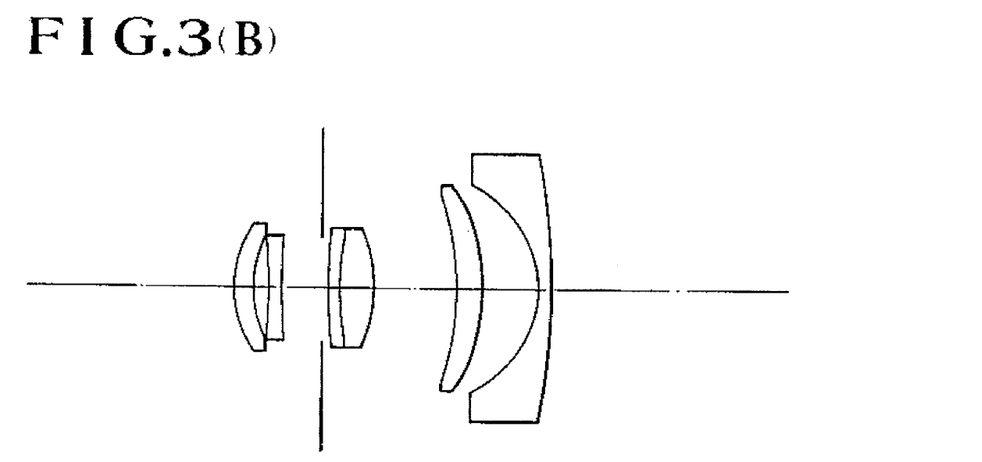
Figure 3C:
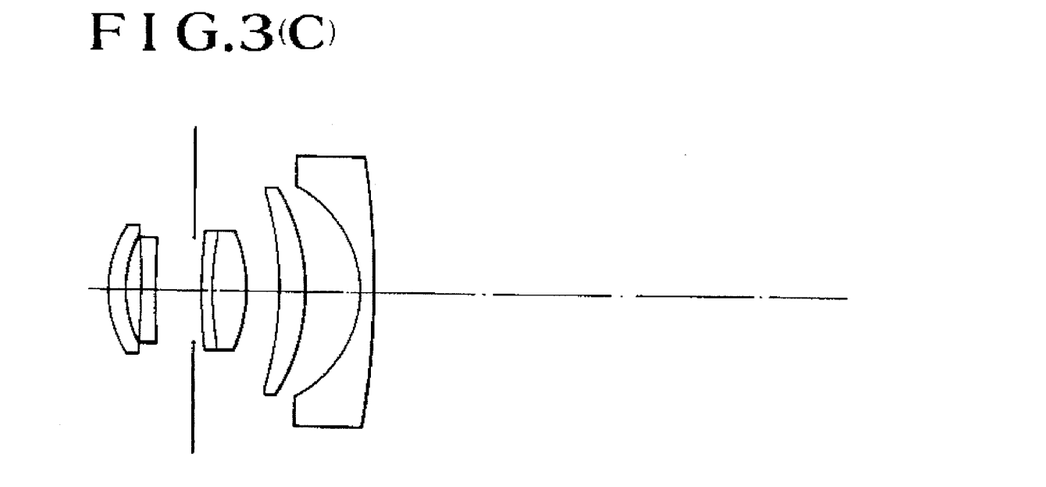
Figure 4A:
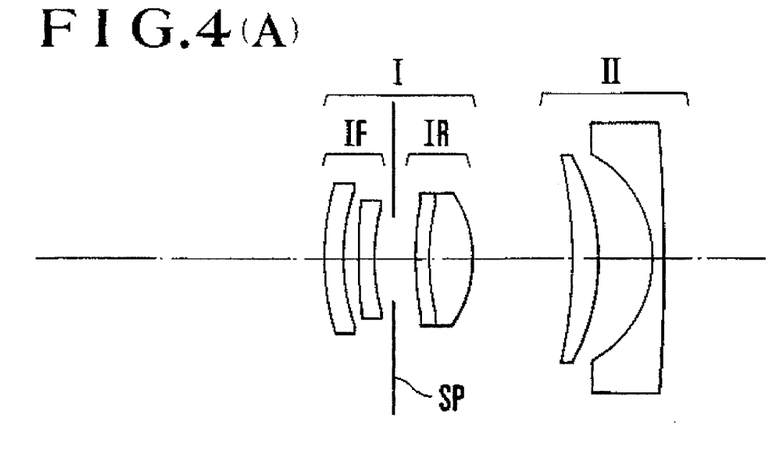
Figure 4B:
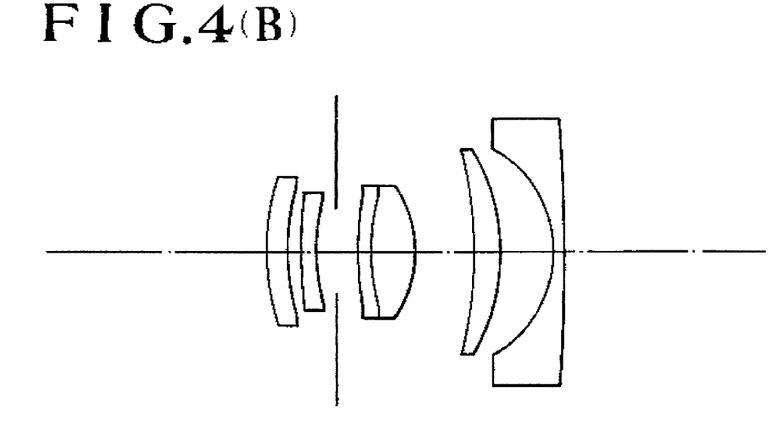
Figure 4C:
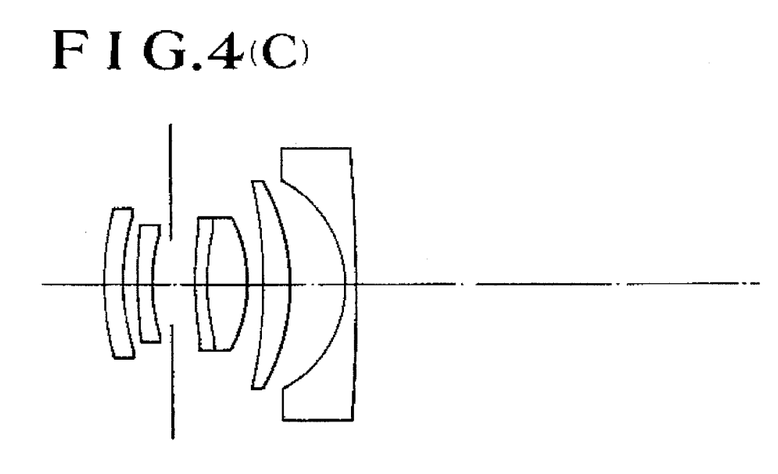
Figure 5A:
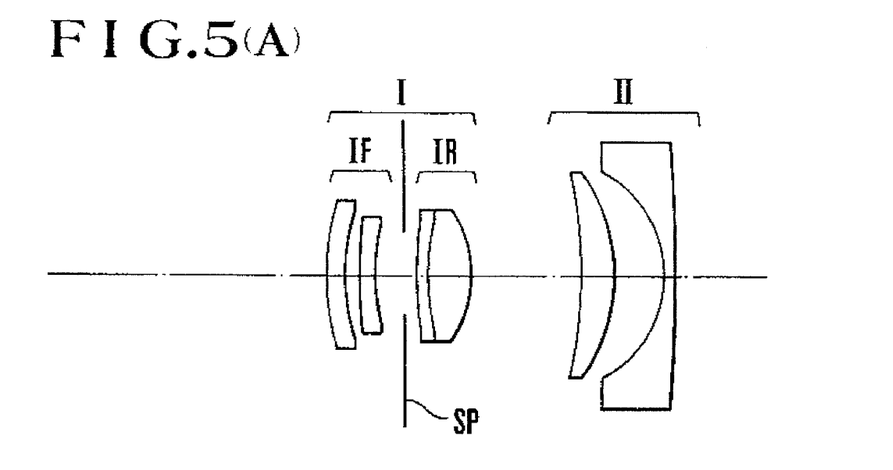
Figure 5B:
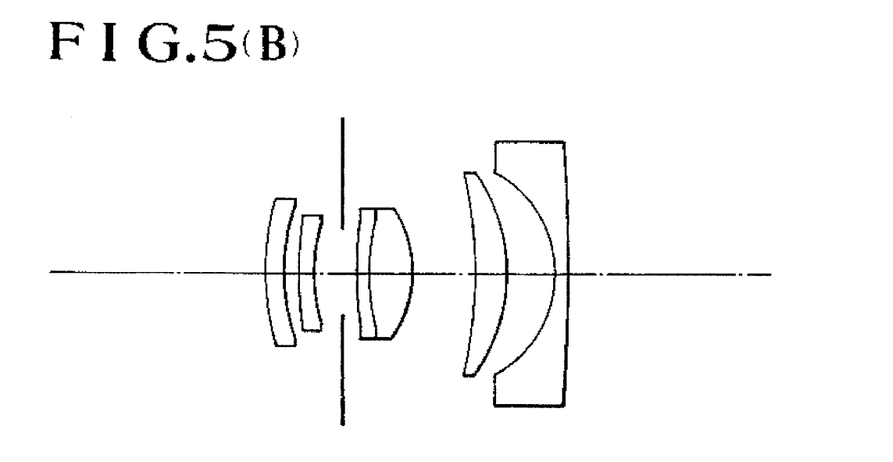
Figure 5C:
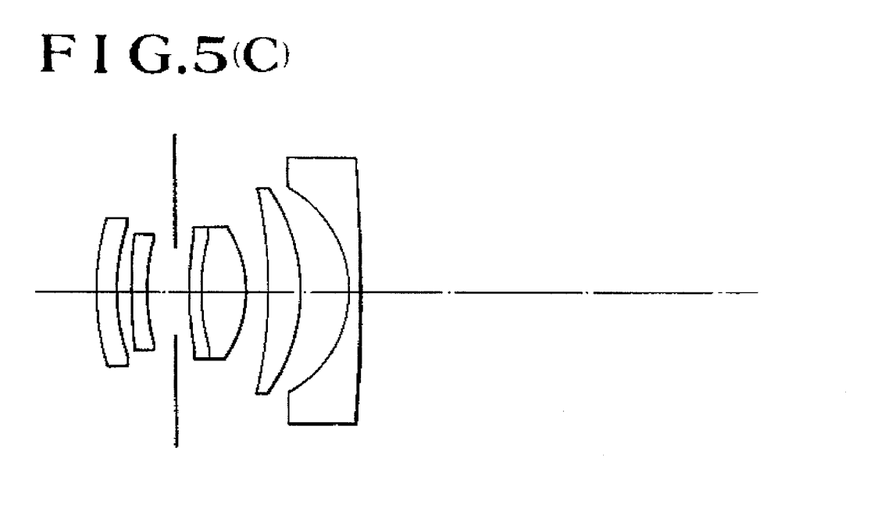
Figure 6:
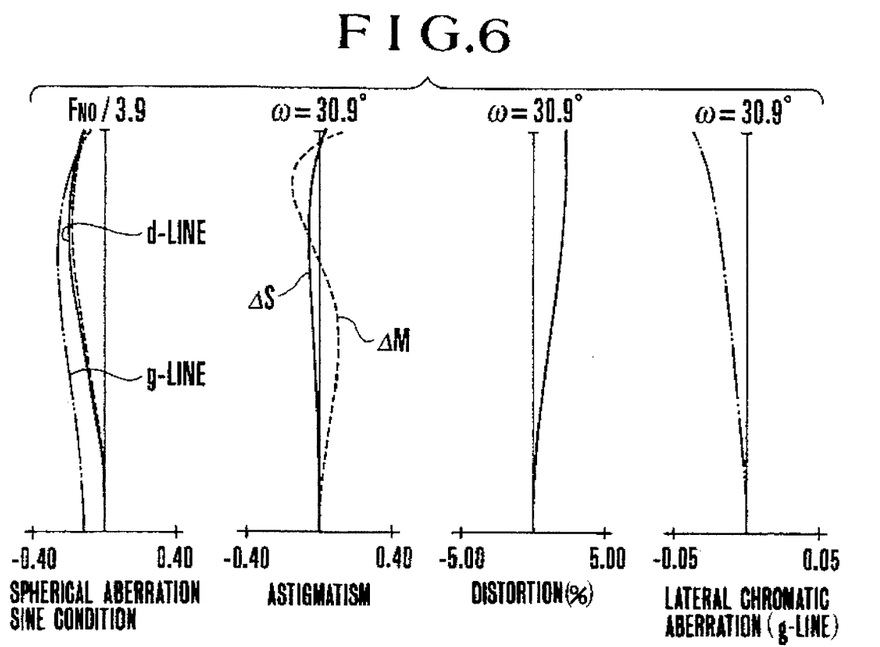
FIG. 6 shows graphic representations of the various aberrations of the numerical example 1 in the wide-angle end.
Figure 7:
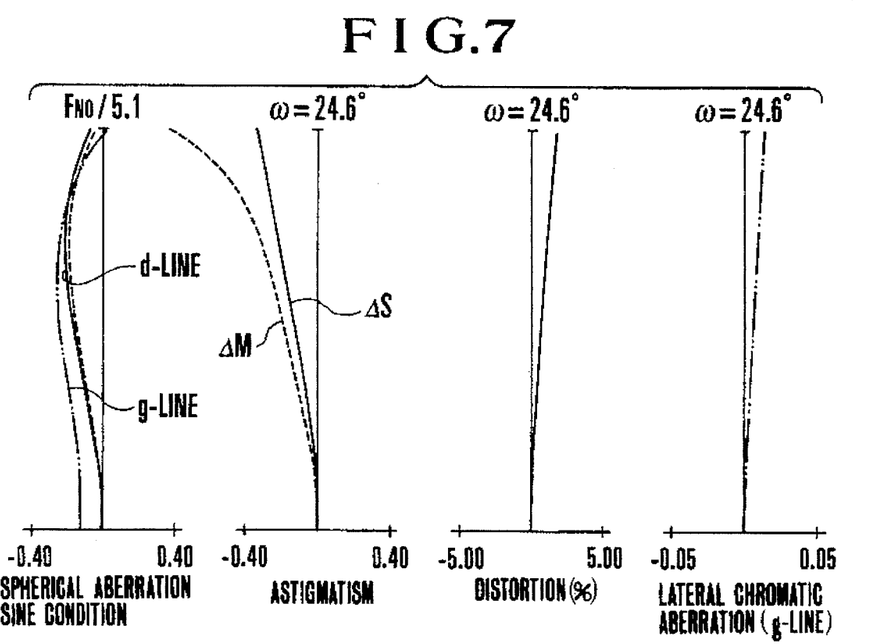
FIG. 7 shows graphic representations of the various aberrations of the numerical example 1 in a middle position.
Figure 8:
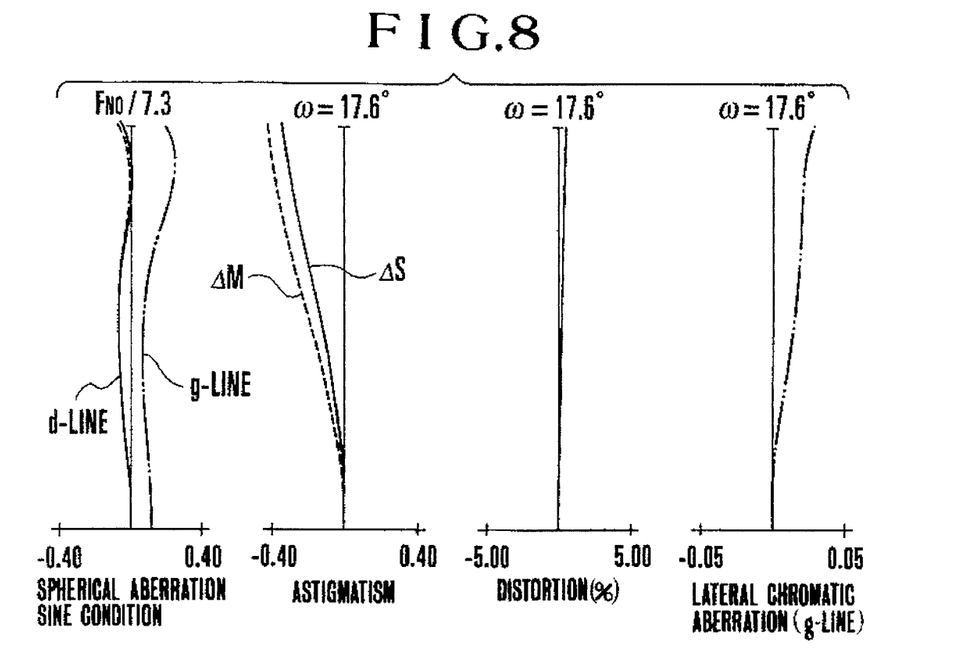
FIG. 8 shows graphic representations of the various aberrations of the numerical example 1 in the telephoto end.
Figure 9:
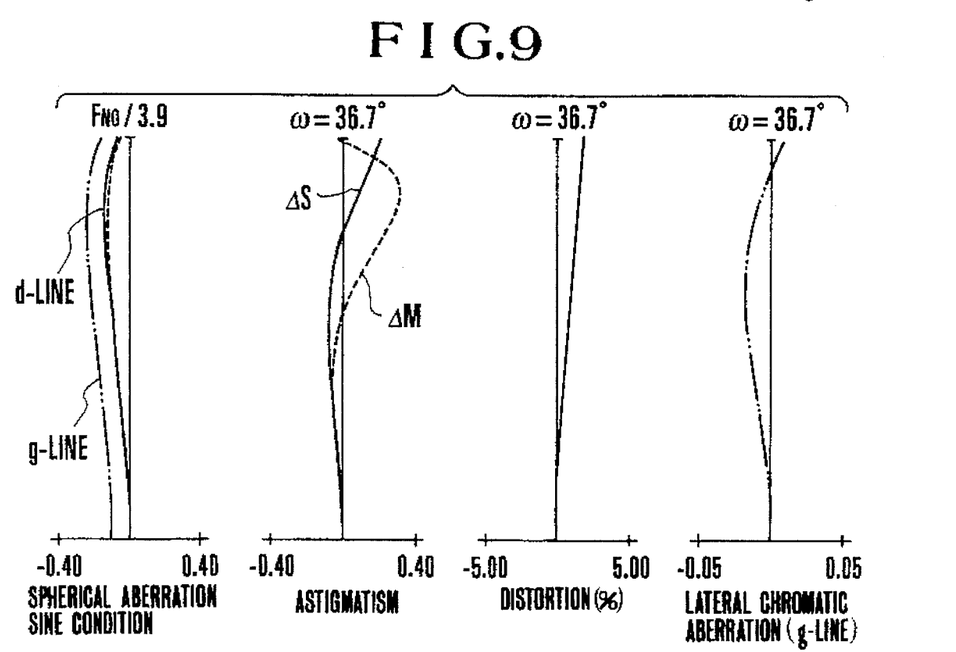
FIG. 9 shows graphic representations of the various aberrations of the numerical example 2 in the wide-angle end.
Figure 10:
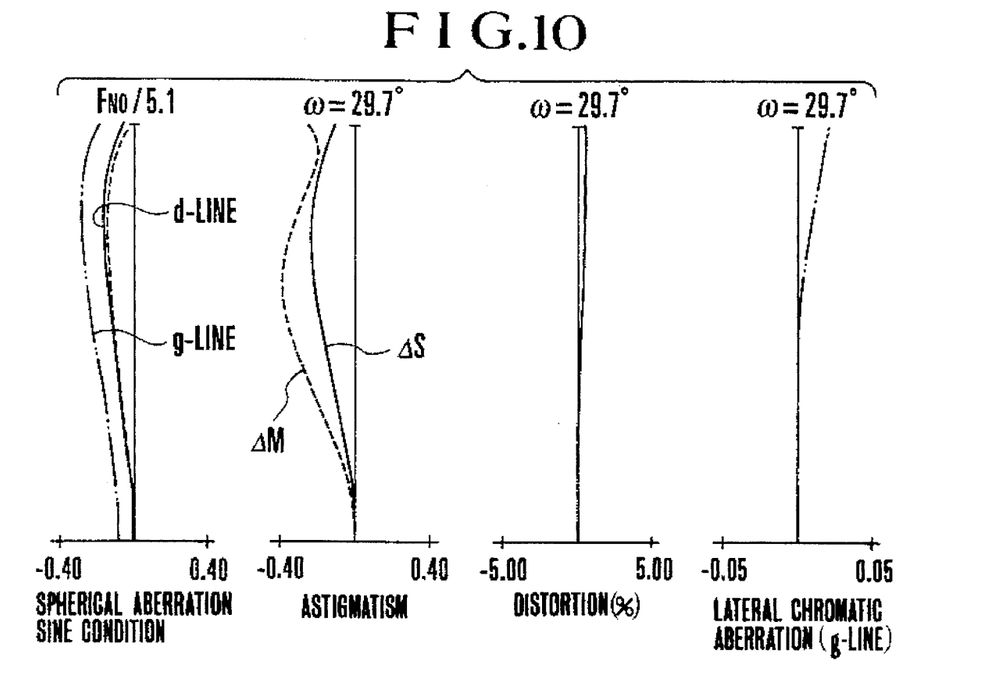
FIG. 10 shows graphic representations of the various aberrations of the numerical example 2 in a middle position.
Figure 11:
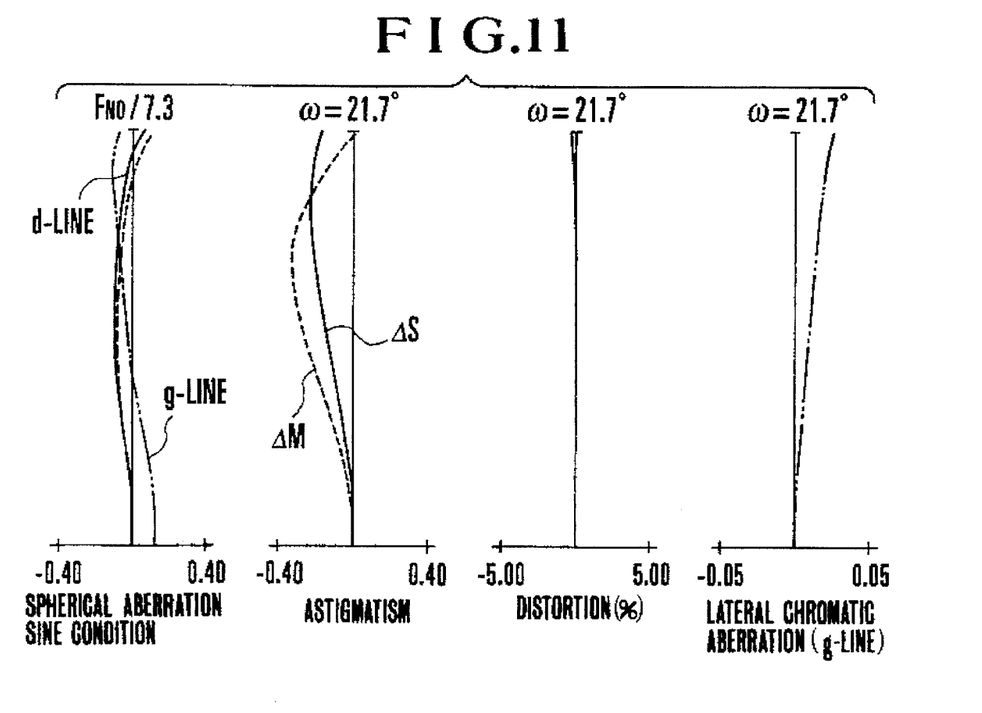
FIG. 11 shows graphic representations of the various aberrations of the numerical example 2 in the telephoto end.

FIG. 1(A) and 1(B) show the paraxial refractive power arrangement of a zoom lens according to the invention. In these drawings, reference character I denotes a first lens unit having a positive refractive power, reference character II denotes a second lens unit having a negative refractive power, and reference character SP stands for a stop. Variation of the magnification from the wide-angle side to the telephoto side is carried out by moving the two lens units I and II toward the object side. At the same time, they are moved in such relation that the air separation between the two lens units I and II narrows. It is to be noted that FIG. 1(A) is in the wide-angle end, and FIG. 1(B) is in the telephoto end. The first lens unit I comprises a front lens unit IF having a negative refractive power and a rear lens unit IR having a positive refractive power. Letting the air separation between the stop SP and the rear lens unit IR when the zoom lens is focused on an infinitely distant object be denoted by l, and the shortest focal length of the entire lens system by fw, to assure maintenance of good optical performance despite the reduction of the size, the following condition is satisfied:

$$0.053 < l/fw < 0.1 \quad (1)$$

This condition (1) is to determine the air separation between the stop SP and the rear lens unit IR. When the air separation is too large as exceeding the upper limit, increase of the size is promoted and it becomes also difficult to correct off-axial aberrations, particularly coma flare due to the upper rays at or near the telephoto end. Meanwhile, when the air separation is too small as exceeding the lower limit, it is advantageous for reducing the size, but it becomes difficult to correct coma flare due to the lower rays.

It should be pointed out that, in the present embodiment, to achieve quick focusing, the front lens unit IF and the rear lens unit IR are made to move in unison under the condition that the stop SP remains stationary as shown schematically in FIGS. 1(A) and 1(B). According to the prior art, in the case of the lens system whose stop is disposed within the first lens unit, it is general that focusing is performed while holding the stop along. If so, the block for focusing becomes heavy. Therefore, quick automatic focusing is difficult to perform, and/or consumption of electrical energy by the drive source hardly saved.

Further, with this 2-unit type of the zoom lens, in order to maintain good optical performance, it is desired to make up the front lens unit IF from a positive lens of meniscus form convex toward the object side and a negative lens and make up the rear lens unit IR from a cemented lens composed of a negative lens of meniscus form convex toward the object side and a bi-convex lens. The use of this cemented lens leads particularly to the suppression of the production of longitudinal chromatic aberration.

Meanwhile, as to the second lens unit, it is desired to construct it from a positive lens of meniscus form convex toward the image side and a negative lens whose front surface is smaller in the radius of curvature than a rear surface thereof.

It is to be noted that, in the present embodiment, especially in the numerical example 2, to provide a wide-angle zoom lens whose image angle in the wide-angle end is greater than 73°, it is desirable to set the lower limit of the above-described condition (1) to 0.065 or thereabout.

Next, numerical examples 1 and 2 of the invention are shown. In the numerical examples 1 and 2, Ri is the radius of curvature of the i-th lens surface, when counted from the object side, Di the i-th lens thickness or air separation, when counted from the object side, and Ni and vi are respectively the refractive index and Abbe number of the glass of the i-th lens element, when counted from the object side.

The shape of an aspheric surface is expressed in the coordinates with an X axis in the axial direction and an H axis in the direction perpendicular to the optical axis, the direction in which light advances being taken as positive by the following equation:

$$X = (1/r)H^2/(1 + \sqrt{1 - (H/R)^2}) + BH^4 + CH^6 + DH^8 + EH^{10}$$

where R is the radius of the osculating sphere, and B, C, D and E are the aspheric coefficients.

It is to be noted that in the values of the aspheric coefficients, D-x represents $10^{-x}$.

| Numerical Example 1 (FIGS. 2(A) to 2(C), 3(A) to 3(C), 6, 7 and 8) | | | |
|---|---|---|---|
| f = 36.2–68.0 | Fno = 1:3.9–7.3 | 2ω = 61.8°–35.3° | |
| r1 = 10.570 | d1 = 1.80 | n1 = 1.51633 | v1 = 64.2 |
| r2 = 12.445 | d2 = 1.25 | | |
| r3 = −71.488 | d3 = 1.30 | n2 = 1.64769 | v2 = 33.8 |
| r4 = 127.939 | d4 = 2.19 | | |
| r5 = (Stop) | d5 = 2.00 | | |
| r6 = 62.401 | d6 = 1.00 | n3 = 1.84666 | v3 = 23.8 |
| r7 = 34.534 | d7 = 3.13 | n4 = 1.51633 | v4 = 64.2 |
| r8 = −12.820 | d8 = variable | | |
| r9 = −33.619 | d9 = 2.43 | n5 = 1.64769 | v5 = 33.8 |
| r10 = −21.778 | d10 = 4.84 | | |
| r11 = −10.476 | d11 = 1.20 | n6 = 1.60311 | v6 = 60.7 |
| r12 = −84.247 | | | |

| l/fw = 0.055 | | | |
|---|---|---|---|
| Variable | Focal Length | | |
| Separation | 36.20 | 47.33 | 67.99 |
| d8 | 10.31 | 5.78 | 1.30 |

| Aspheric Coefficients | | |
|---|---|---|
| | r4 Aspheric Surface | r10 Aspheric Surface |
| Paraxial R | 1.27939D + 02 | −2.17783D + 01 |
| B | 1.35588D − 04 | −4.67616D − 05 |
| C | 1.15092D − 06 | −1.01744D − 07 |
| D | 0 | −4.93564D − 09 |
| E | 0 | 7.00164D − 12 |

| Numerical Example 2 (FIGS. 4(A) to 4(C), 5(A) to 5(C), 9, 10 and 11) | | | |
|---|---|---|---|
| f = 29.0–54.35 | Fno = 1:3.9–7.3 | 2ω = 73.4°–43.4° | |
| r1 = 21.577 | d1 = 1.80 | n1 = 1.58313 | v1 = 59.4 |
| r2 = 30.930 | d2 = 1.20 | | |
| r3 = 45.831 | d3 = 1.30 | n2 = 1.65844 | v2 = 50.9 |
| r4 = 14.709 | d4 = 1.82 | | |
| r5 = (Stop) | d5 = 2.00 | | |
| r6 = 35.155 | d6 = 1.00 | n3 = 1.84666 | v3 = 23.8 |
| r7 = 18.928 | d7 = 3.88 | n4 = 1.60311 | v4 = 60.7 |
| r8 = −11.289 | d8 = variable | | |
| r9 = −40.105 | d9 = 2.58 | n5 = 1.64769 | v5 = 33.8 |
| r10 = −20.879 | d10 = 4.43 | | |
| r11 = −10.617 | d11 = 1.20 | n6 = 1.71300 | v6 = 53.8 |
| r12 = −156.476 | | | |

| l/fw = 0.069 | | | |
|---|---|---|---|
| Variable | Focal Length | | |
| Separation | 29.01 | 37.88 | 54.35 |
| d8 | 8.89 | 4.99 | 1.13 |

| Aspheric Coefficients | | |
|---|---|---|
| | r2 Aspheric Surface | r10 Aspheric Surface |
| Paraxial R | 3.09305D + 01 | −2.08786D + 01 |
| B | 1.82161D − 04 | −4.44530D − 05 |
| C | 3.32441D − 06 | −1.01111D − 07 |

| | | |
|---|---|---|
| D | −8.47425D − 08 | −2.26853D − 09 |
| E | 3.25524D − 09 | −3.98911D − 12 |

As has been described above, according to the invention, it has been made possible to provide a zoom lens which, though having a zoom ratio of about 2, takes an ultra-compact form and is well corrected for aberrations.

Again, during focusing, the stop is made to remain stationary when the first lens unit alone moves. Therefore, it is made possible to provide a zoom lens which is faster in the focus adjustment and economical as electric energy is saved.

What is claimed is:

1. A small-sized variable magnification lens comprising, from front to rear, a first lens unit having a positive refractive power and a second lens unit having a negative refractive power, an air separation between said first lens unit and said second lens unit being varied to vary magnification, wherein said first lens unit comprises, from front to rear, a front lens unit having a negative refractive power, a stop and a rear lens unit having a positive refractive power, satisfying the following condition:

$0.053 < l/fw < 0.1$ where l is an air separation between said stop and said rear lens unit when said variable magnification lens is focused on an infinitely distant object, and fw is the shortest focal length of the entire lens system.

2. A small-sized variable magnification lens according to claim 1, wherein focusing is performed by moving said front lens unit and said rear lens unit, while holding said stop stationary.

3. A small-sized variable magnification lens according to claim 1, wherein said front lens unit comprises a positive lens of meniscus form convex toward an object side and a negative lens, and wherein said rear lens unit comprises a cemented lens composed of a negative lens of meniscus form convex toward the object side and a bi-convex lens.

4. A small-sized variable magnification lens according to claim 3, wherein said second lens unit comprises a positive lens of meniscus form convex toward an image side and a negative lens whose front surface is smaller in the radius of curvature than a rear surface thereof.

5. A small-sized variable magnification lens comprising, from front to rear, a first lens unit having a positive refractive power and a second lens unit having a negative refractive power, an air separation between said first lens unit and said second lens unit being varied to vary magnification, wherein said first lens unit comprises, from front to rear, a front lens unit having a negative refractive power, a stop and a rear lens unit having a positive refractive power, and wherein focusing is performed by moving said front lens unit and said rear lens unit, while holding said stop stationary.

6. A small-sized variable magnification lens according to claim 5, satisfying the following condition:

$0.053 < l/fw < 0.1$ where l is an air separation between said stop and said rear lens unit when said variable magnification lens is focused on an infinitely distant object, and fw is the shortest focal length of the entire lens system.

7. A small-sized variable magnification lens according to claim 5, wherein said front lens unit comprises a positive lens of meniscus form convex toward an object side and a negative lens, and wherein said rear lens unit comprises a cemented lens composed of a negative lens of meniscus form convex toward the object side and a bi-convex lens.

8. A small-sized variable magnification lens according to claim 7, wherein said second lens unit comprises a positive lens of meniscus form convex toward an image side and a negative lens whose front surface is smaller in the radius of curvature than a rear surface thereof.

* * * * *

UNITED STATES PATENT AND TRADEMARK OFFICE
CERTIFICATE OF CORRECTION

PATENT NO. : 5,585,971
DATED : December 17, 1996
INVENTOR(S) : YOSHINORI ITOH

It is certified that error appears in the above-indentified patent and that said Letters Patent is hereby corrected as shown below:

On the title page, item

[56] References Cited

U.S. PATENT DOCUMENTS

"5,305,148   4/1994   Ikeori, et al." should read
--5,305,148   4/1994   Ikemori, et al.--.

COLUMN 2

Line 31, "an-object" should read --an object--.
Line 60, "FIG." should read --FIGS.--.

COLUMN 3

Line 59, "vi" should read --$\nu$i--.

Signed and Sealed this

Twenty-second Day of July, 1997

Attest:

BRUCE LEHMAN

Attesting Officer    Commissioner of Patents and Trademarks